(No Model.) 2 Sheets—Sheet 2.

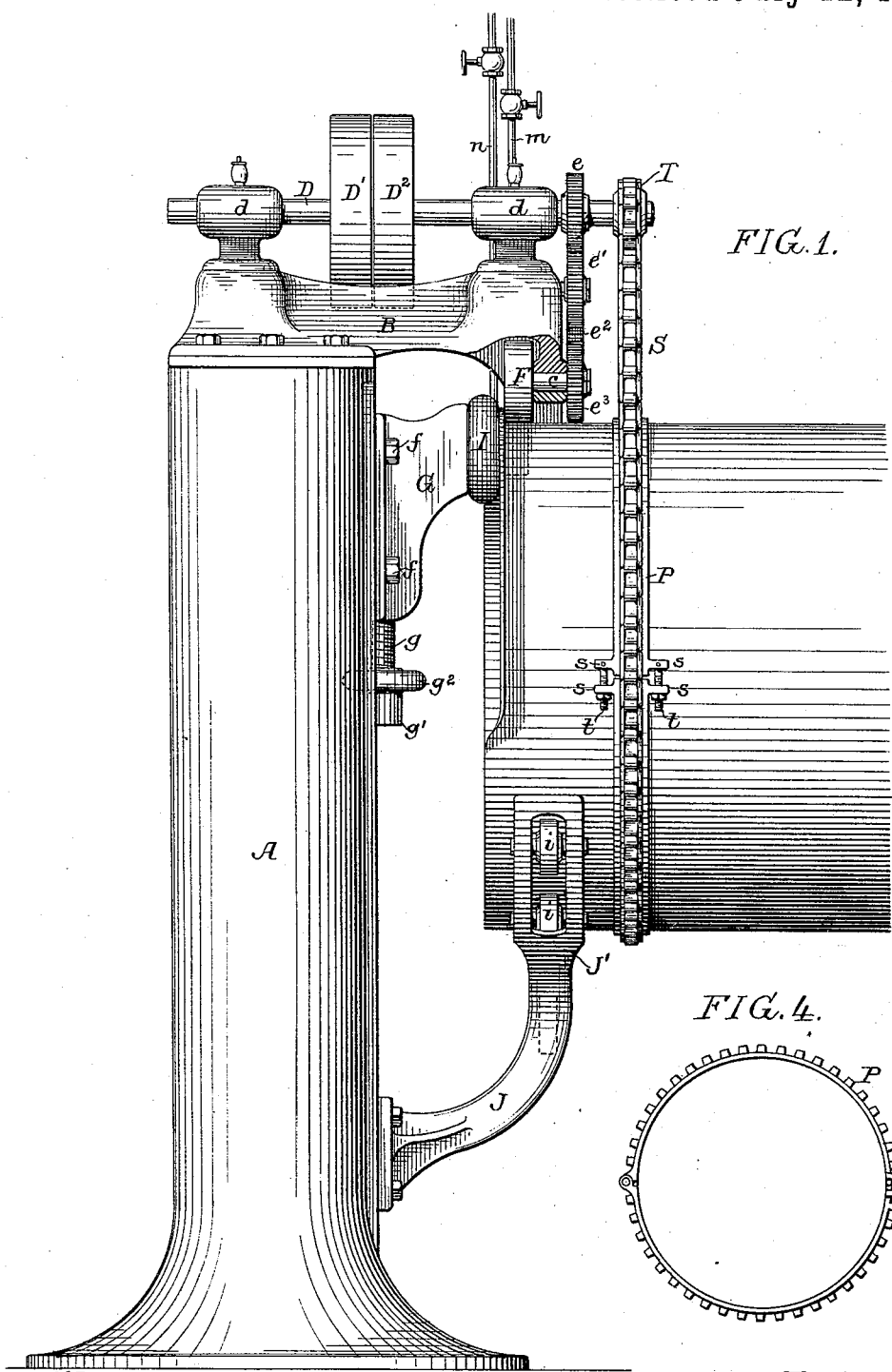

R. K. WELCH.
PIPE FLANGING MACHINE.

No. 478,670. Patented July 12, 1892.

Witnesses:
A. V. Groupe.
Fred D. Goodwin.

Inventor:
Robert Kemp Welch
by his Attorneys
Howson & Howson

UNITED STATES PATENT OFFICE.

ROBERT KEMP WELCH, OF PHILADELPHIA, PENNSYLVANIA, ASSIGNOR OF ONE-HALF TO GEORGE E. SCHLEGELMILCH, OF SAME PLACE.

PIPE-FLANGING MACHINE.

SPECIFICATION forming part of Letters Patent No. 478,670, dated July 12, 1892.

Application filed June 24, 1891. Serial No. 397,279. (No model.)

*To all whom it may concern:*

Be it known that I, ROBERT KEMP WELCH, a citizen of the United States, and a resident of Philadelphia, Pennsylvania, have invented certain Improvements in Pipe-Flanging Machines, of which the following is a specification.

The object of my invention is to construct a machine for rapidly and effectively flanging the ends of sheet-metal pipes, and this object I attain in the manner hereinafter set forth, reference being had to the accompanying drawings, in which—

Figure 3:
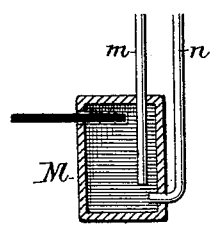
Figure 2:
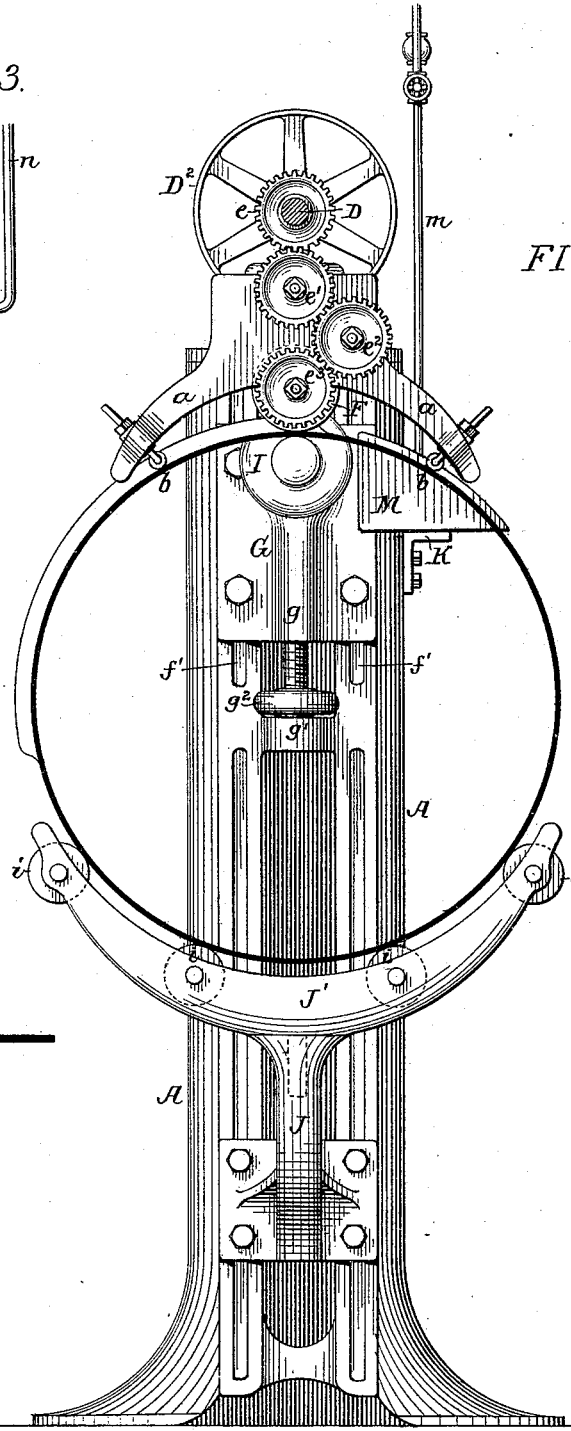
Figure 5:
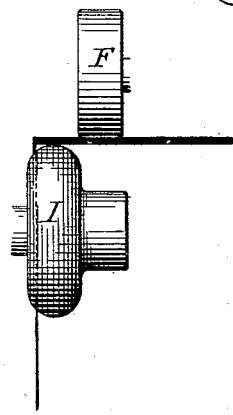
Figure 6:
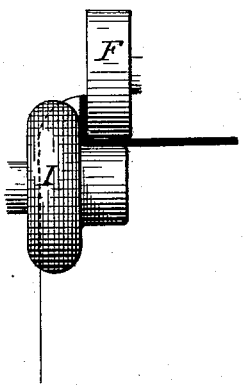

Figure 1 is a side view, partly in section, of a pipe-flanging machine constructed in accordance with my invention. Fig. 2 is a front view of the same with the pipe in section. Fig. 3 is a detached view, on an enlarged scale, of a heating-box forming part of the machine. Fig. 4 is a view on a reduced scale of a sprocket-wheel clamp forming part of the same; and Figs. 5 and 6 are enlarged views of the flanging-rolls and part of the pipe, illustrating the operation of the machine.

In Figs. 1 and 2, A represents a column or standard having at the top a projecting head B, with forked depending outer end, each arm $a$ of the fork being provided with a bearing-roller $b$, adjustable from and toward the arm, as shown in Fig. 2. Mounted on the head B are bearings $d$ for a shaft D, which has fast and loose pulleys $D'$ $D^2$ for receiving a belt from a pulley on any adjacent counter-shaft, and said shaft D is geared by a suitable system of transmitting-gearing to a shaft $c$, adapted to a suitable bearing in the depending end of the head B, said shaft $c$ carrying a roll F and the transmitting-gearing, comprising in the present instance a series of spur-wheels $e$, $e'$, $e^2$, and $e^3$.

Mounted on the front of the column A is a bracket G, which is confined to the face of the column by means of bolts $f$, adapted to vertical slots $f'$ in said column, the vertical adjustment of the bracket G being effected by a screw-stem $g$, adapted to a suitable nut on the bracket and mounted in a lug $g'$ on the column A, said set-screw having a wheel or handle $g^2$, whereby it may be readily manipulated in order to raise or lower the bracket G. Said bracket has a bearing for the spindle of a roll I, which is what I term a "right-angled roll," in that it has a vertical portion adjacent to the vertical outer face of the roll F, this vertical portion being the main acting face of the roll and at right angles to the periphery of the outer bearing-roll F.

To the column A, near the base of the same, is secured a curved bracket J, and to the upper end of this bracket is fitted a forked rest J', which has bearings for a series of rollers $i$.

Mounted upon a bracket K at one side of the column A is a box or casing M, having in the face of the same a segmental slot of the same curve as that of the pipe to be acted upon, and with the chamber within this box or casing M communicate valved pipes $m$ and $n$, one conveying a supply of air under pressure and the other conveying a supply of gas under pressure. In flanging the end of the pipe the bracket G is first lowered on the column A, so that the pipe may be introduced longitudinally into the machine beneath the roll F, and so that the projecting end of the pipe overlaps the vertical portion of the roll I, as shown in Fig. 5, the bracket J being adjusted so that the rollers on the curved rest J' provide a proper support for the pipe, said rest being of the same curve as that of the pipe which is being treated, the upper portion of said pipe adjacent to the roll F being steadied by the upper rollers $b$, which can be adjusted in the arms $a$ so as to properly bear upon the pipe on each side of said roll. A portion of the end of the pipe projects through the slot of the box or casing M, and a mixture of air and gas is permitted to enter said box and is ignited therein, so as to heat that portion of the end of the pipe contained therein. As soon as the proper heating of said portion of the pipe has been effected the pipe is turned slowly on its supports, so as to bring the heated portion beneath the roll F, a succeeding portion of the end of the pipe being carried into the box M to be heated in turn. As soon as the heated portion of the pipe is brought under the roll F the bracket G and its roll I are raised so that that portion of the heated end of the pipe which is acted on by said roll I is turned up at a right angle to the body of the pipe, as shown in Figs. 1 and 6, and the turning of the pipe on its supports is then continued, so that one heated portion after another is brought under the influence of the rolls F and I until the entire end of the pipe has been flanged in the manner set forth; or, if desired, the pipe may be continuously turned before any action of the roll I thereon until the entire end of the pipe has become heated to the desired extent, whereupon the roll I may be adjusted to operative position and a final turn imparted to the pipe in order to effect the flanging of the heated end of the same. The method first described is, however, the preferable one.

The turning of the pipe may be effected, if desired, by the attendant; but in many cases, especially in dealing with pipes of large diameter, it is preferable to effect such turning of the pipe by power, and for this purpose I provide a detachable clamp P, Fig. 4, consisting of two semicircular parts of the same radius as the pipe, these parts being hinged together at one side and provided at the other side with clamping-lugs $s$ and clamp-bolts $t$, and said clamp P is provided with sprocket-teeth for the reception of a chain S, which is also adapted to a sprocket-wheel T on the shaft D, the driving-gear being so proportioned, by preference, that the pipe will travel at the same surface speed as the roll F.

It will of course be understood that there is a clamp P and rest J' for each size of pipe to be treated, the upper rollers $b$, however, being adjustable, so as to accommodate different sizes of pipes.

Having thus described my invention, I claim and desire to secure by Letters Patent—

1. The combination, in a pipe-flanging machine, of the external bearing-roll and the right-angled flanging-roll with a heating-box through which the end of the pipe passes before reaching the rolls, said box being located in advance of the rolls and in close proximity thereto, substantially as specified.

2. The combination of the external bearing-roll, the right-angled flanging-roll, a support for the bottom of the pipe, and bearings for the upper portion of the pipe on each side of the external bearing-roll, said bearings being adjustable from and toward the pipe, substantially as specified.

3. The combination of the external bearing-roll and the flanging-roll with the heating-box in advance of the same, said box having a curved slot for the reception of a portion of the end of pipe, and valved air and gas supply pipes for said box, substantially as specified.

4. The combination of the external bearing-roll, the right-angled flanging-roll, the support for the pipe, and the detachable sprocket-wheel clamp for said pipe with a sprocket-chain engaging said clamp and serving to aid in supporting the pipe and to rotate the pipe so as to bring successive portions of the same under the action of the rolls, substantially as specified.

In testimony whereof I have signed my name to this specification in the presence of two subscribing witnesses.

ROBERT KEMP WELCH.

Witnesses:
EUGENE ELTERICH,
HARRY SMITH.